United States Patent Office 2,720,900
Patented Oct. 18, 1955

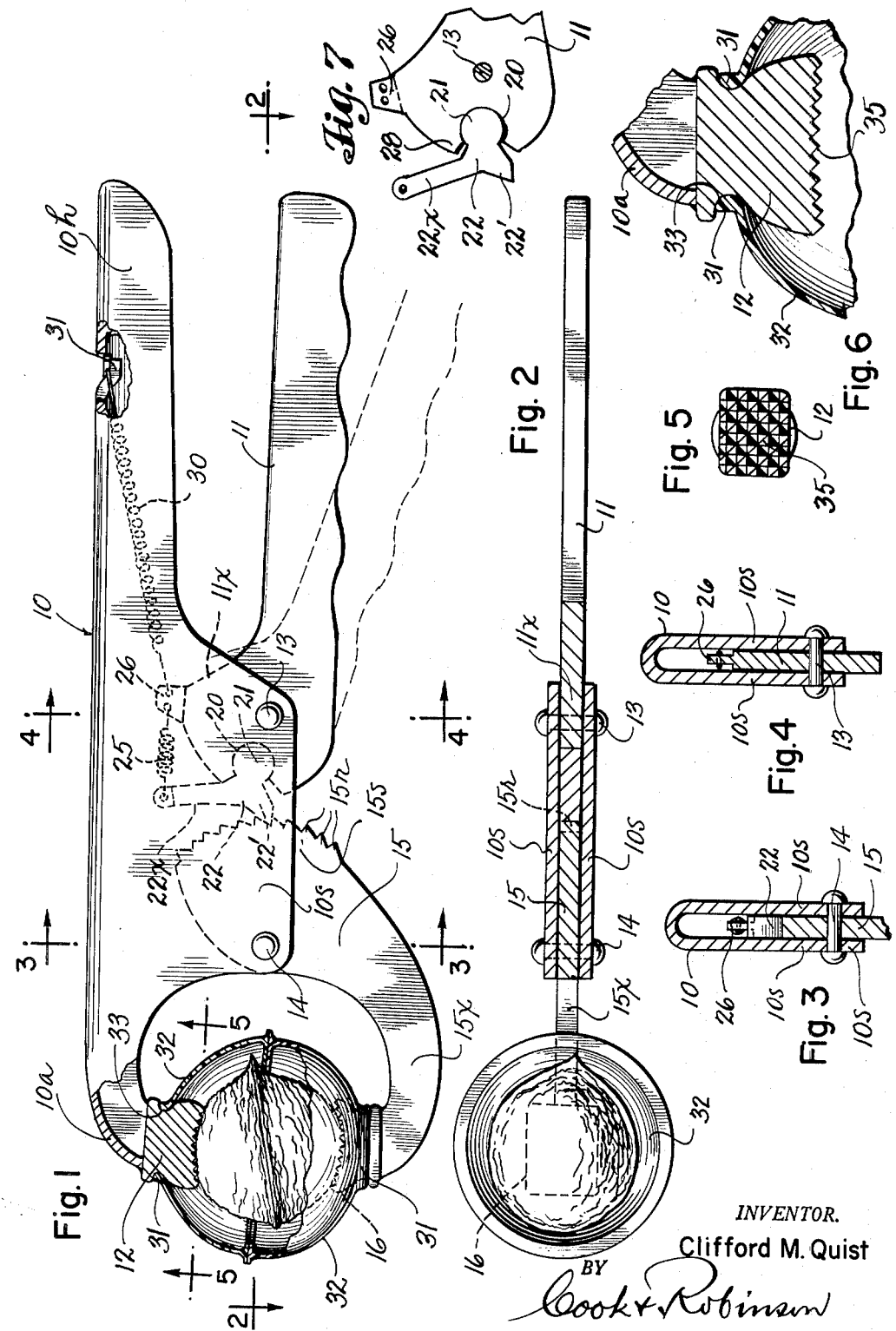

2,720,900

NUT CRACKER HAVING A RESILIENT RECEPTACLE

Clifford M. Quist, Puyallup, Wash.

Application October 17, 1952, Serial No. 315,233

2 Claims. (Cl. 146—14)

This invention relates to hand operated nut crackers, and it has reference more particularly to improvements in nut crackers that may be described as being of "pliers" type; it being the principal object of this invention to provide an exceptionally efficient, practical and easily operated device of the type designated, for the cracking of nuts between the opposedly related jaws thereof through the action of its hand gripped levers.

It is a further object of the invention to provide a nut cracker of the type above stated that is characterized by the provision of a pair of pivotally joined jaws, one of which may be said to be stationary and the other normally freely movable for adjustment between open and closed positions relative to the stationary jaw, and between which jaws a selected nut can be easily placed for cracking merely by opening the jaws apart, placing the nut against the stationary jaw, closing the freely movable jaw thereagainst and nut cracking pressure then applied by the jaws through the mediacy of a pawl and ratchet mechanism that is associated with the movable jaw and the corresponding hand lever of the device.

Another object of the invention resides in the provision of a pressure applying connection between the movable jaw and its corresponding hand lever that permits the lever to be adjusted, relative to the stationary lever, to the most advantageous relationship for hand gripping and the application of the nut cracking pressure, regardless of the size of the nut that is placed between the jaws.

Still another object of the invention is to provide novel enclosing cups associated with the two jaws that coact for retaining the cracked nut intact, thus to avoid the scattering of shells and the loss of nut meat incident to the cracking operation.

Other objects and advantages of the invention reside in the specific details of construction of its various parts; in their relationship to each other and in the manner of use of the device as will hereinafter be fully described.

In accomplishing these and other objects of the invention, I have provided the improved details of construction, the preferred forms of which are illustrated in the accompanying drawings, wherein—

Fig. 1 is a side view of a nut cracker embodying the improvements of the present invention therein; parts being broken away for the purpose of illustration.

Fig. 2 is a horizontal sectional view, taken through the device, substantially on the line 2—2 in Fig. 1.

Fig. 3 is a cross-section taken on line 3—3 in Fig. 1.

Fig. 4 is a cross-section taken on line 4—4 in Fig. 1.

Fig. 5 is a face view of one of the nut engaging blocks applied to the jaws.

Fig. 6 is an enlarged sectional detail of one of the nut holding blocks and a part of the nut enclosing cup.

Fig. 7 is a detailed side view of the pawl and flat head portion of the cooperating hand lever.

Referring more in detail to the drawings:

The present nut cracking device, as herein shown in a preferred form of construction, comprises a pair of pivotally joined levers, designated generally by numerals 10 and 11, which are adapted to be held in the hand in the manner of gripping the handle portions of an ordinary pair of pliers. One of the levers, herein referred to as the stationary lever, and shown to be the upper lever 10, is formed as a single piece, from sheet metal and the piece is folded back upon itself along a longitudinal center line, to give the lever the U-shaped cross sectional form in which it has been shown in Figs. 3 and 4. At one end, the lever 10 is reduced in its vertical width to provide a rather narrow hand grip portion 10h. At its forward end, the lever 10 has a downturned portion 10a that mounts a jaw block designated in its entirety by numeral 12. Intermediate its ends the lever 10 is substantially increased in width to form the opposite side plates 10s—10s, and it is between these plates that the inner end portion of the lever 11 is contained and is pivotally secured for swinging movement toward and from lever 10 by a pivot pin 13 that extends through the parts as shown in Fig. 4. The outer end of the lever 11 terminates substantially even with the outer end of the hand grip portion 10h of the lever 10. Preferably the lever 11 is formed with an undulating under edge surface providing seats or depressions designed to receive the fingers to afford a better hand grip on the device.

Pivotally mounted between the opposite side plates 10s and 10s of the upper lever 10 by means of a pivot pin 14 extended therethrough, is a jaw mounting lever 15, formed with a flat body portion of substantial width from which a narrowed portion 15x extends. At its forward end, the part 15x mounts a jaw block 16 thereon in opposed relationship to the jaw block 12 and adapted to be closed toward and opened away from it by the pivotal action of the lever 15 on pivot pin 14. The relatively wide inner end portion of lever 15 terminates in an arcuate segment 15s equipped with ratchet teeth 15r, along the arc; this being centered in the axis of the pivot pin 14.

The forward end portion of the hand lever 11 is formed with an enlarged, flat head portion 11x which, like the body portion of lever 15, is closely contained between the spaced opposite side plates 10s—10s of the lever 10. This head portion 11x is formed in that edge portion adjacent the ratchet teeth of lever 15, with a circular socket 20, open at the side that faces the ratchet. Pivotally contained in the socket 20 is a circular mounting lug 21 formed as an integral part of pawl 22. This pawl has a downwardly directed, pointed toe 22' adapted to be engaged with the ratchet teeth 15r, and it has an upward extended arm 22x. A coiled spring 25 is attached under tension to the upper end of the arm 22x and to a flange or ear 26 extending upwardly from the upper edge of the head portion 11x of lever 11, thus to yieldingly urge the pawl toe toward engaging contact with the ratchet teeth of lever 15. The pawl toe is limited in its movement away from the ratchet teeth under pull of the spring 25 by reason of contact of the arm portion 22x with a stop, designated at 28, on the head 11x.

It is also shown in Fig. 1 that a coiled spring 30 is attached under tension to the flange 26 and to an ear 31 that is stamped downwardly from the hand grip portion 10h of lever 10, to yieldingly urge the lever 11 toward an "open position," away from handle 10h. When the lever 11 is moved to this open position, seen in dotted lines in Fig. 1, it carries the toe of the pawl to a position free of contact with the ratchet teeth and it is by reason of this that the jaw forming lever 15 can be freely pivoted about pivot 14 for the placing of a nut between the jaws and the easy closing of the jaws against the nut without causing any movement of lever 11.

Another feature of the invention resides in equipping the two jaw blocks 12 and 16 with complemental semi-spherical cups 32—32 designed to receive the nut within them when it is placed in cracking position between the jaw blocks. Each of these semi-spherical cups is made of thin, resilient, transparent rubber or plastic. Each has a central opening bounded by a stiff bead 31 that seats in an encircling groove 33 formed in the mounting shank 34 of the jaw block. The normal tension of the cup forming material holds the cups in the sphere forming relationship in which they are shown in Fig. 1. However, it is quite easy, by reason of their resiliency, to reverse their cupping so that they will face away from each other. The reversing of one or both cups makes it quite easy to place the nut in place and then they can be sprung back to position to enclose the nut therein.

The jaw blocks preferably are of the shape shown in Fig. 5, but may be altered as may be desired or required. Also, it is preferred that they have their nut engaging surfaces slightly cupped and also knurled as indicated at 35 in Fig. 5.

To use the device, the gripping hand which holds the levers 10h and 11 is relaxed so that the lever 11 will be actuated to its full open position by the spring 30. The nut is then placed against the jaw block 12, by the other hand and with the same operation the jaw block 16 is closed against the nut as in Fig. 1. Then the gripping hand closes the lever 11 toward the lever 10h and in the closing action, the pawl toe 22' is almost immediately engaged with a ratchet tooth, thus causing lever 15 to move pivotally and the jaw blocks 12 and 16 to apply the cracking pressure against the held nut.

The leverage, provided by the pivotal connecting of the parts, is so increased that adequate pressure against the nut for cracking can be effected. If necessary a new grip on the ratchet toothed lever can be effected after an initial cracking operation by merely opening the gripping hand and allowing the lever 11 to be moved toward open position, and the pawl to take a new hold on the ratchet, then again closing it.

If the cups 32—32 are to be used, they may be closed about the nut after it has been placed in cracking position. If it is not desired to use them, they can be easily removed from the blocks, or just reversed in their direction of cupping.

Devices of this kind are easy to use, relatively inexpensive, and are practical in that the jaws readily adapt themselves to nuts of various kinds and sizes, hand pressure is increased through the leverage herein provided and the hand grip levers automatically adjust themselves to the most practical relationship regardless of the size of the nut.

The device can be made of various materials and details of construction and design might be modified to substantial extent without departing from the spirit of the invention.

Having thus described my invention, what I claim as now therein, and desire to secure by Letters Patent, is:

1. In a nut cracker having coacting jaw portions adapted to be opened apart to receive a nut between them for cracking and to be closed toward each other to crack the nut; each of said jaws having a nut engaging block fixed thereto; said blocks each having a knurled nut engaging surface and a reduced neck portion, and a semi-spherical cup of a resilient material applied to the reduced neck portion of each block and adapted to coact in the nut cracking operation to form a spherical enclosure for the held nut; at least one of said cups being easily reversible in direction of cupping without removal from the block.

2. A nut cracker of the character described comprising in combination; a first lever formed from a single piece of sheet metal, folded upon itself along a central longitudinal line to provide spaced opposite face plates, said lever terminating at one end in a handle portion and at its other end in an inturned jaw, a nut engaging block mounted by said jaw, a second lever having a flattened head portion at one end disposed and pivotally mounted between the opposite face plates of the first lever intermediate its ends, and having a jaw portion at its other end turned toward the jaw of the said first lever, a nut engaging block applied to said jaw portion of the second lever in opposed relation to the first mentioned block for the gripping of a nut between them; said head portion of the second lever having a ratchet toothed segment formed arcuately about its pivot axis, a handle lever extended along the handle portion of the first lever and having a head portion at one end disposed and pivotally mounted between the face plates of the first mentioned lever, a pawl pivoted on the said head portion of the handle lever to engage the ratchet toothed segment of the head portion of said second lever when said handle members are actuated toward each other to move the jaw thereof toward the jaw of the first lever, a spring attached under tension to the head portion of the handle lever and to the handle portion of the first lever to urge the handle portions apart, to remove the pawl from engagement with the ratchet segment, and a spring urging the pawl to position for engaging the ratchet toothed segment when the handle members are squeezed together and allowing it to ratchet over said teeth when they are moved apart.

References Cited in the file of this patent

UNITED STATES PATENTS

| | | |
|---|---|---|
| 2,185,349 | McGill | Jan. 2, 1940 |
| 2,413,178 | Feltman | Dec. 24, 1946 |
| 2,521,552 | Thompson | Sept. 5, 1950 |

FOREIGN PATENTS

| | | |
|---|---|---|
| 285,836 | Germany | July 15, 1915 |
| 975,797 | France | Oct. 17, 1950 |